(12) United States Patent
Ding et al.

(10) Patent No.: US 11,881,688 B2
(45) Date of Patent: Jan. 23, 2024

(54) DYNAMIC ANOMALY LOCALIZATION OF UTILITY POLE WIRES

(71) Applicant: NEC Laboratories America, Inc., Princeton, NJ (US)

(72) Inventors: Yangmin Ding, North Brunswick, NJ (US); Sarper Ozharar, Princeton, NJ (US); Yuandu Xu, Jersey City, NJ (US); Yue Tian, Princeton, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 130 days.

(21) Appl. No.: 17/717,088

(22) Filed: Apr. 10, 2022

(65) Prior Publication Data
US 2022/0329052 A1   Oct. 13, 2022

Related U.S. Application Data

(60) Provisional application No. 63/173,542, filed on Apr. 12, 2021.

(51) Int. Cl.
*H02G 1/02*    (2006.01)
*G01S 19/01*   (2010.01)
*G01D 5/353*   (2006.01)

(52) U.S. Cl.
CPC .......... *H02G 1/02* (2013.01); *G01D 5/35354* (2013.01); *G01S 19/01* (2013.01)

(58) Field of Classification Search
CPC .. H02G 1/02; G01D 5/35354; G01D 5/35374; G01D 5/35358; G01S 19/01
See application file for complete search history.

(56) References Cited

U.S. PATENT DOCUMENTS

| | | | |
|---|---|---|---|
| 2012/0017687 A1* | 1/2012 | Davis | G01D 5/35358 73/655 |
| 2021/0318165 A1* | 10/2021 | Ozharar | G01H 9/004 |
| 2022/0283001 A1* | 9/2022 | Ding | G01D 5/35358 |
| 2022/0329052 A1* | 10/2022 | Ding | G01D 5/35354 |
| 2022/0329068 A1* | 10/2022 | Ding | G01D 5/35338 |

FOREIGN PATENT DOCUMENTS

| | | | | | |
|---|---|---|---|---|---|
| GB | 2503498 A | * | 1/2014 | ............. | G01D 5/268 |
| GB | 2583712 A | * | 11/2020 | ............. | G01D 5/353 |
| WO | WO-2022046949 A1 | * | 3/2022 | ............. | G01H 9/004 |

* cited by examiner

*Primary Examiner* — An T Nguyen
(74) *Attorney, Agent, or Firm* — Joseph Kolodka

(57) ABSTRACT

Systems and methods for performing the dynamic anomaly localization of utility pole aerial/suspended/supported wires/cables by distributed fiber optic sensing. In sharp contrast to the prior art, our inventive systems and methods according to aspects of the present disclosure advantageously identify a "location region" on a utility pole supporting an affected wire/cable, thereby permitting the identification and reporting of service personnel that are uniquely responsible for responding to such anomalous condition(s).

8 Claims, 7 Drawing Sheets

DYNAMIC ANOMALY LOCALIZATION OF UTILITY POLE WIRES

CROSS REFERENCE TO RELATED APPLICATIONS

This application claims the benefit of U.S. Provisional Patent Application Ser. No. 63/173,542 filed 12 Apr. 2021 the entire contents of each is incorporated by reference as if set forth at length herein.

TECHNICAL FIELD

This disclosure relates generally to distributed fiber optic sensing (DFOS) systems methods and structures. More particularly, it describes systems and methods for dynamically locating utility pole wires/cables suspended therefrom or attached thereto by DFOS and machine learning.

BACKGROUND

As those skilled in the art will readily appreciate, distributed fiber optic sensing systems and methods have shown to be of great utility and provide a range of useful services such as sensing various physical parameters including temperature, vibration, strain, etc., thereby enabling a new era of infrastructure monitoring.

Utility poles are well known and recognizable in contemporary society and are typically associated with suspending telecommunications, electrical power, and other infrastructure facilities thereby providing an efficient distribution of telecommunications traffic and electrical power. Given their importance to contemporary society, when an anomaly occurs with respect to the telecommunications or electrical facilities a quick identification and reporting of the anomalous condition to an appropriate responder is of critical importance.

SUMMARY

An advance in the art is made according to aspects of the present disclosure directed to systems and methods for performing the dynamic anomaly localization of utility pole aerial/suspended/supported wires/cables by distributed fiber optic sensing.

In sharp contrast to the prior art, our inventive systems and methods according to aspects of the present disclosure advantageously identify a "location region" on a utility pole supporting an affected wire/cable, thereby permitting the identification and reporting of service personnel that are uniquely responsible for responding to such anomalous condition(s). Stated alternatively, our inventive systems and methods will identify whether a power utility wire/cable or a telecommunications wire/cable is the affected wire/cable, and report such affected wire/cable to the responsible party.

Our inventive system and method according to the present disclosure advantageously combines distributed fiber sensing with a machine learning model to identify any dynamic events occurring on different wires. The distributed fiber sensing interrogator collects real-time data for pre-processing. The pre-processed data is transferred to a machine learning model for wire type prediction and identification. The GPS coordinates of each pole along the wire are stored in the cloud which can be accessed by the interrogator.

Advantageously, the distributed fiber optic sensing utilizes existing telecommunication fiber optic cables as a distributed sensor to capture the dynamic response of the wires, which enables real-time data collection and streaming. Linear model trees (LMT) are employed that combine linear models and decision trees to create a hybrid model which when applied to processed data collected from distributed fiber sensing allows for identifying dynamic events on the wires.

The GPS coordinates of each pole from a one-time field survey are stored in a network/cloud storage which can be accessed by a distributed fiber sensing interrogator. Once a dynamic event on the wire is triggered, the GPS coordinates of the two utility poles suspending affected wires are be reported to an appropriate/responsible authority.

BRIEF DESCRIPTION OF THE DRAWING

A more complete understanding of the present disclosure may be realized by reference to the accompanying drawing in which.

Figure 1:
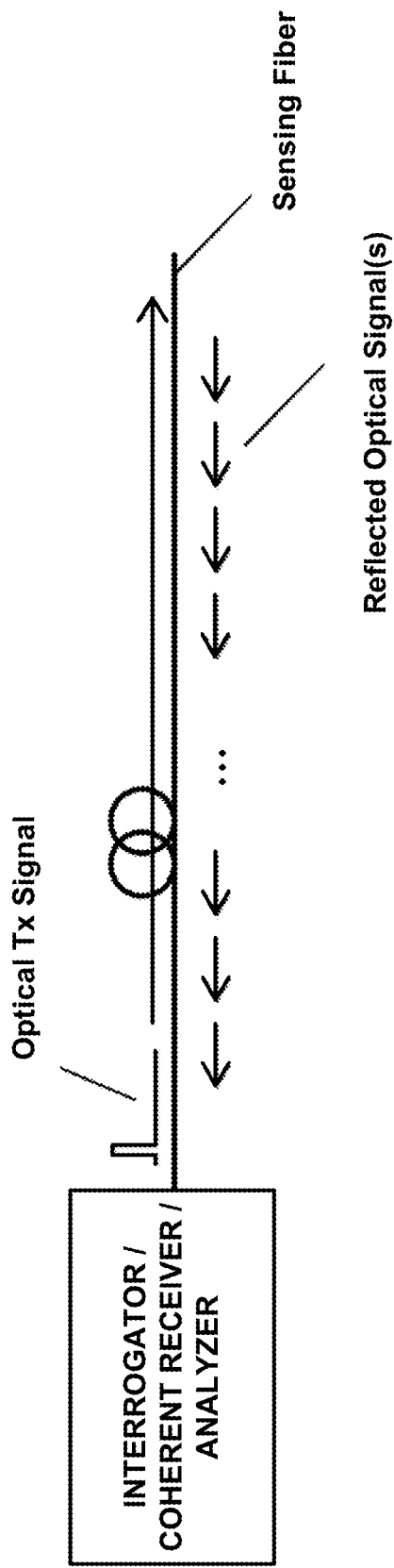
FIG. 1 is a schematic diagram of an illustrative prior art distributed fiber optic sensing system.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that distributed fiber optic sensing systems interconnect optoelectronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Fiber optic sensing measures changes in "backscattering" of light occurring in an optical sensing fiber when the sensing fiber encounters vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

A schematic diagram illustrating the generalized arrangement and operation of a prior art distributed fiber optic sensing system is shown in FIG. 1. With reference to FIG. 1 one may observe an optical sensing fiber that in turn is connected to an interrogator. As is known, contemporary interrogators are systems that generate an input signal to the fiber and detects/analyzes reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes the interrogator that periodically generates optical pulses (or any coded signal) and injects them into an optical fiber. The injected optical pulse signal is conveyed along the optical fiber.

At locations along the length of the fiber, a small portion of signal is scattered/reflected and conveyed back to the interrogator. The scattered/reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

Distributed Acoustic Sensing (DAS)/Distributed Vibrational Sensing (DVS) systems detect vibrations and capture acoustic energy along the length of optical sensing fiber. Advantageously, existing, traffic carrying fiber optic networks may be utilized and turned into a distributed acoustic sensor, capturing real-time data. Classification algorithms may be further used to detect and locate events such as leaks, cable faults, intrusion activities, or other abnormal events including both acoustic and/or vibrational.

Various DAS/DVS technologies are presently used with the most common being based on Coherent Optical Time Domain Reflectometry (C-OTDR). C-OTDR utilizes Rayleigh back-scattering, allowing acoustic frequency signals to be detected over long distances. An interrogator sends a coherent laser pulse along the length of an optical sensor fiber (cable). Scattering sites within the fiber cause the fiber to act as a distributed interferometer with a gauge length like that of the pulse length (e.g. 10 meters). Acoustic disturbance acting on the sensor fiber generates microscopic elongation or compression of the fiber (micro-strain); which causes a change in the phase relation and/or amplitude of the light pulses traversing therein.

Before a next laser pulse is be transmitted, a previous pulse must have had time to travel the full length of the sensing fiber and for its scattering/reflections to return. Hence the maximum pulse rate is determined by the length of the fiber. Therefore, acoustic signals can be measured that vary at frequencies up to the Nyquist frequency, which is typically half of the pulse rate. As higher frequencies are attenuated very quickly, most of the relevant ones to detect and classify events are in the lower of the 2 kHz range.

Figure 2:
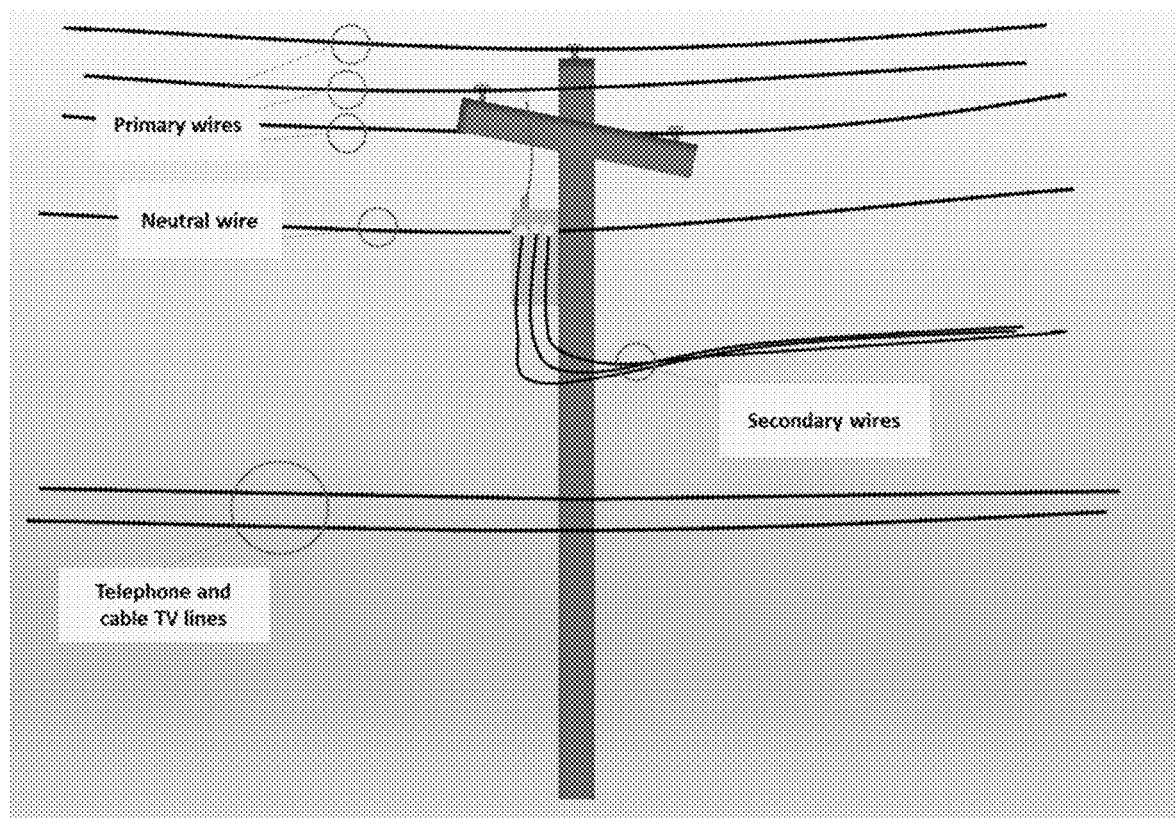
FIG. 2 is a schematic diagram illustrating wires/cables aerially suspended/supported by a utility pole according to aspects of the present disclosure.

FIG. 2 is a schematic diagram illustrating wires/cables aerially suspended/supported by a utility pole according to aspects of the present disclosure. As may be observed from that figure, utility poles generally include three different "layers" or "spaces" supporting/providing cables/wires/etc. as depicted in the figure. A top-most layer is referred to as the supply space, which typically includes primary wires carrying electricity and sometimes a ground wire. A middle layer is the neutral space, which includes neutral wire(s). The bottom-most layer is the communication space, which includes telephone and cable TV wires/cables. Each entity/company/organization that provides the particular wires/cables is generally responsible for maintaining their own wire/cables.

As will be readily understood and appreciated, all of the above-mentioned wires/cables that are located on (suspended from) a utility pole can be subject to dynamic hazards such as falling tree(s), animal activities, drone/kite flying, automobile accidents, weather, etc., that affect the suspended wires/cables. When such hazards are not properly addressed, serious service interruption(s) and threats to persons/property may result.

As will be further appreciated, when hazards affect wires/cables suspended from utility pole(s), quick identification of affected wires/cables and reporting of an accurate location of the affected wire/cable responsible organization (service provider that owns/maintains the affected wires/cables) is extremely important for service preservation/recovery. For utility poles in rural areas, this is even more important since it may be prohibitively time-consuming for a human technician to localize any affected/interrupted wires/cables—section-by-section—without first correctly pinpointing which wires/cables have an issue.

Figure 3:
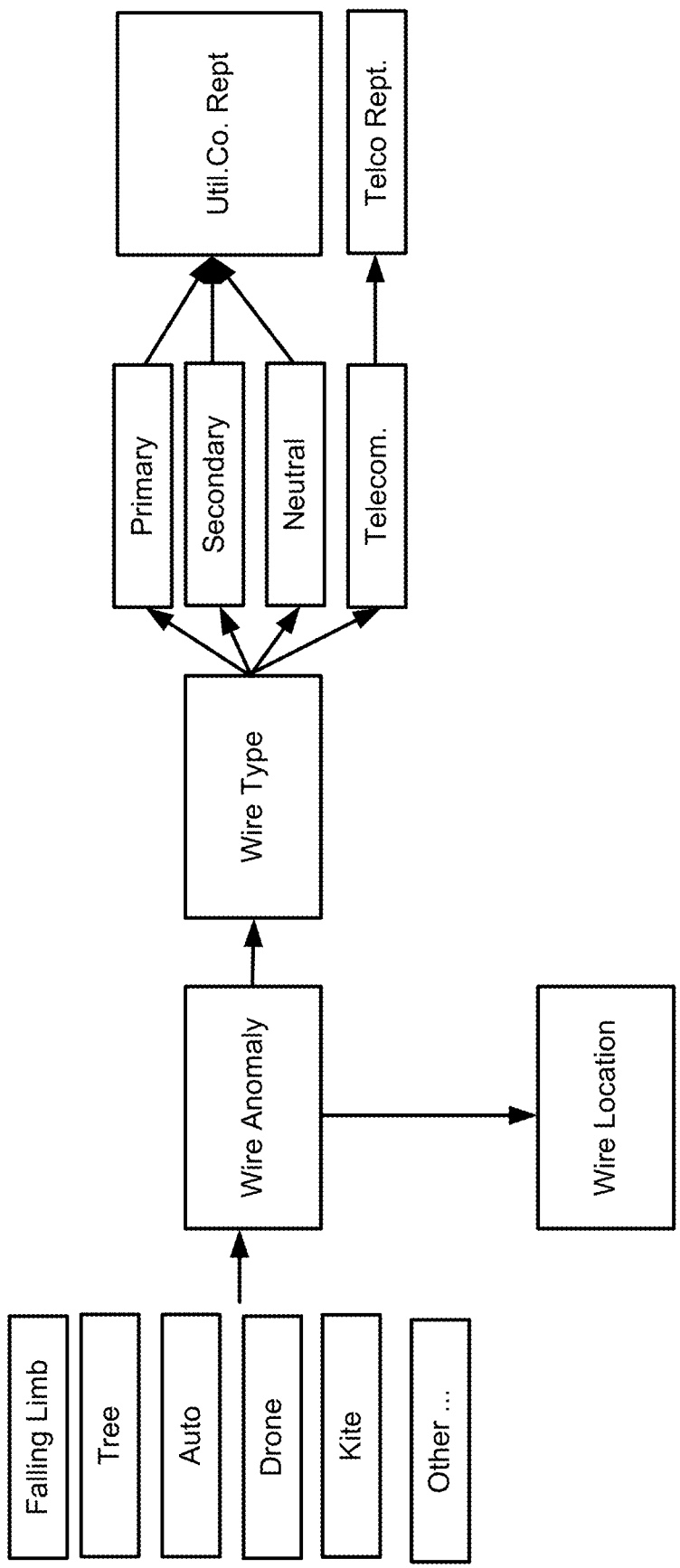
FIG. 3 is a schematic flow diagram illustrating problem associated with anomaly detection of wires/cables aerially suspended from utility poles according to aspects of the present disclosure.

FIG. 3 is a schematic flow diagram illustrating problem associated with anomaly detection of wires/cables aerially suspended from utility poles according to aspects of the present disclosure. While not specifically shown, such identification may advantageously include a global positioning system (GPS) location of any affected wire(s)/cable(s). As illustrated in the figure, external events such as falling limbs, trees, kites, etc., may affect or otherwise cause anomaly on suspended wires/cables. When so detected, the location and type of wire is identified. Such identification may include the GPS coordinates of the utility pole suspending the affected wires/cables and further indication of the type of wire/cable namely, primary, neutral, secondary, communications that may be determined from specific region(s) of the utility pole producing detectable DFOS signals. Once the particular type of wire/cable is determined, an appropriate service organization namely, electrical power utility company, and or telecommunications company may be notified by report(s).

Figure 4:
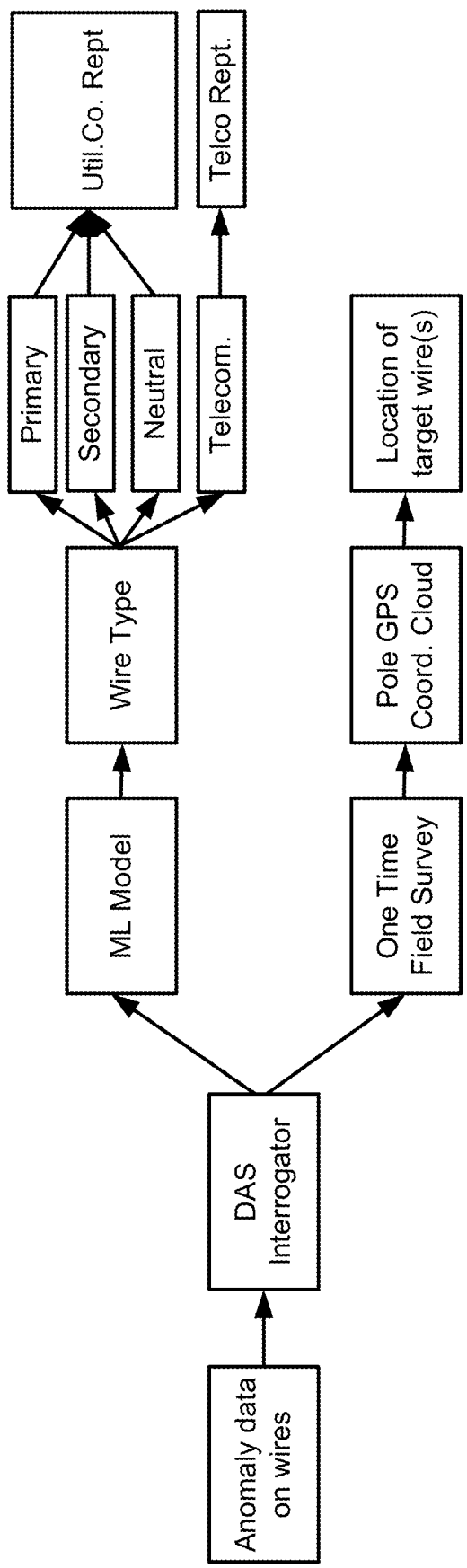
FIG. 4 is a schematic flow diagram illustrating specific wire type identification associated with an anomaly for wires/cables aerially suspended from utility poles according to aspects of the present disclosure.

FIG. 4 is a schematic flow diagram illustrating specific wire type identification associated with an anomaly for wires/cables aerially suspended from utility poles according to aspects of the present disclosure;

As we shall show and describe, our inventive disclosure combines distributed fiber optic sensing with a machine learning model to identify the dynamic events occurring on different wires. The distributed fiber sensing interrogator collects real-time data for pre-processing. The pre-processed data is transferred to a machine learning model for wire/cable type prediction and identification. The GPS coordinates of each pole along the wire are stored in locally or in a "cloud"/network storage which can be subsequently accessed by the interrogator or other analysis system Those skilled in the art will now appreciate that our inventive disclosure provides at least two key features namely, a machine learning model (linear model trees) that identifies which affected wire(s)/cable(s) is/are interrupted by dynamic events; and a database that stores GPS coordinates of utility poles that are be used to locate the affected target wire(s)/cable(s).

Operationally, our machine learning model is pre-trained and pretested. For example, in a weight dropping test onto primary electrical wires/cables and telecommunications wires/cables, in total there are 1900 data points, between two utility poles. After collection, our inventive method may split the data points into two halves—one half for training, one half for testing. Tree-based ensemble methods are employed with 500 hundreds estimators. Our resulting training accuracy is 97% and testing accuracy is 95.3%.

Figure 5:
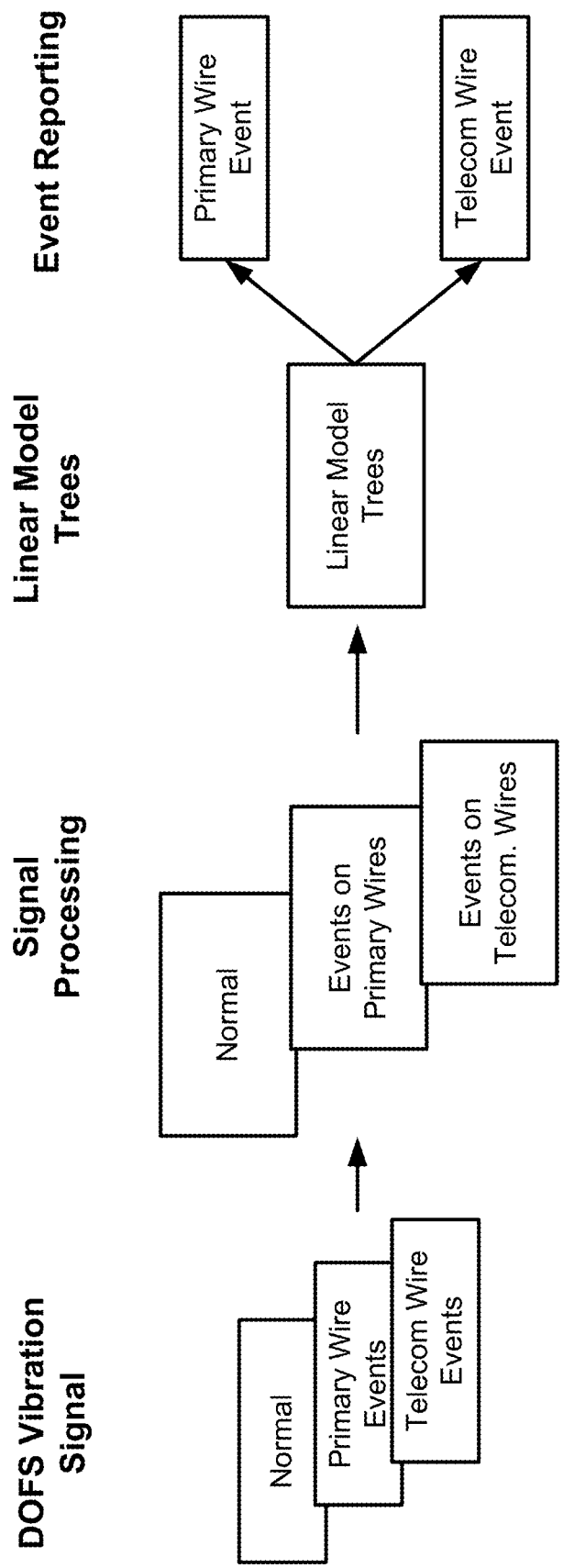
FIG. 5 is a schematic flow diagram illustrating the use of linear model trees for specific wire type identification associated with an anomaly for wires/cables aerially suspended from utility poles according to aspects of the present disclosure.

FIG. 5 is a schematic flow diagram illustrating the use of linear model trees for specific wire type identification associated with an anomaly for wires/cables aerially suspended from utility poles according to aspects of the present disclosure.

Figure 6:
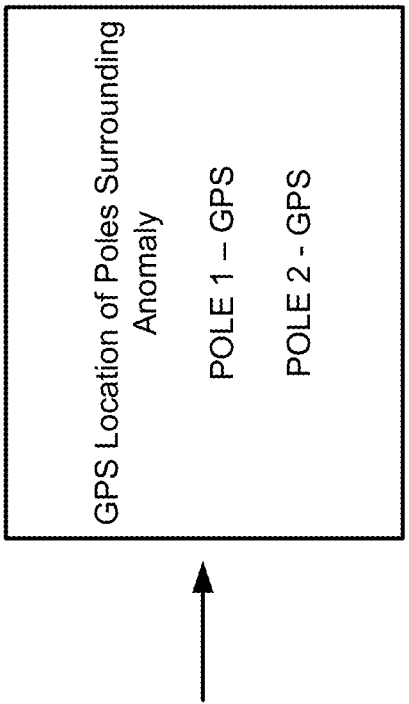
FIG. 6 is a schematic flow diagram illustrating specific wire localization associated with an anomaly for wires/cables aerially suspended from utility poles according to aspects of the present disclosure.

FIG. 6 is a schematic flow diagram illustrating specific wire localization associated with an anomaly for wires/cables aerially suspended from utility poles according to aspects of the present disclosure. With reference to that figure it may be observed that when an anomaly is detected by our distributed fiber sensing system, the rough/approximate locations along the fiber optic sensor cable where the anomaly occurs is extracted automatically by the system. The corresponding GPS coordinates of the two utility poles proximate to the affected wire(s) are simultaneously transferred from the cloud database which stores all the GPS coordinates of the poles along the fiber route. As a result, the exact geographic location of the affected wire can be pinpointed.

Operationally, our inventive method involves a number of steps that may be identified as follows.

Step 1: Connect the distributed fiber sensing interrogator to the aerial cable suspended from utility poles and collect DFOS strain signal along a target route. Data quality checkup, filtering, windowing may be applied to confirm the validity of the raw data.

Step 2: Perform a hammer test—i.e., mechanically excite the pole(s) by mechanically impacting the poles with a "hammer"—on poles for pole localization. In this step, the GPS location is recorded and uploaded to the database/cloud. This provides information for quick localization of the affected wires when an anomaly occurs.

Step 3: Connect the distributed fiber sensing interrogator to the route of interest and start monitoring the route continuously.

Step 4: Upon detection of an anomaly occurs, the DFOS system automatically extract the raw data (vibration signal) with along the length of the affected route. Simultaneously, the GPS location of the starting pole and ending pole of the affected wire range will be transferred from cloud database.

Step 5: The extracted raw data (vibration signal) from Step 4 is fed into the machine learning model for prediction.

Step 6: The machine learning model identifies which layer (electrical/telecommunications) of the utility pole is affected. The system triggers an alarm and sends the GPS location to the responsible company for onsite checkup.

Figure 7:
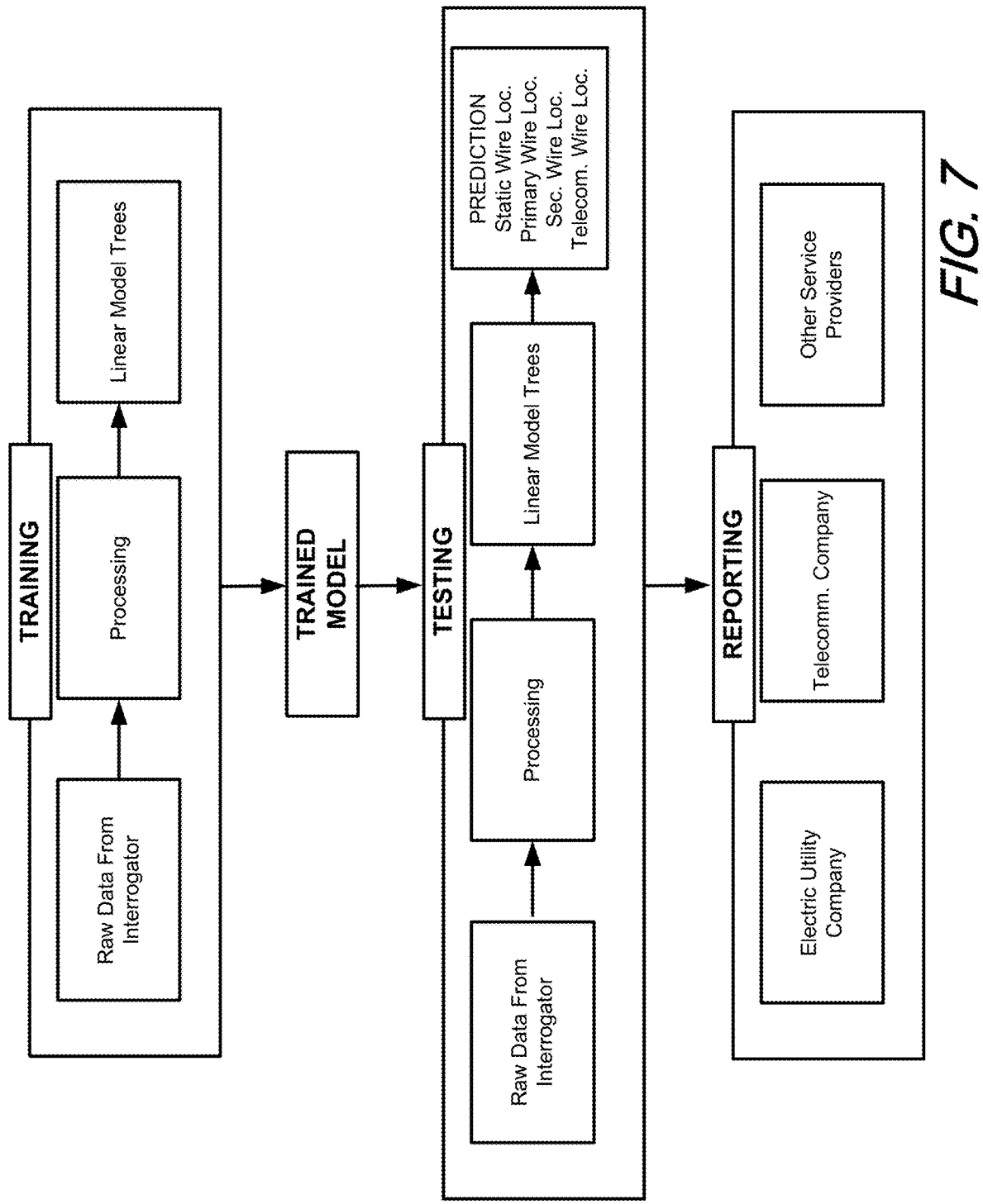
FIG. 7 is a schematic flow diagram illustrating features associated with aspects of the present disclosure.

FIG. 7 is a schematic flow diagram illustrating features associated with aspects of the present disclosure.

As may be observed from this figure, our inventive method and system is first trained by capturing raw data, signal processing the raw data to develop linear model trees that are used to develop an overall trained model.

Subsequent testing then collects additional raw data, performs signal processing and applies the processed data to the trained model (linear model trees) to make subsequent predictions with respect to anomalies that may be associated with static wires, primary wires, secondary wires and telephone and/or cable TV wires. Upon anomaly detection, an appropriate report is generated and conveyed to the proper one or more of electric utility, telecommunications carrier, and/or other service provider(s).

At this point, while we have presented this disclosure using some specific examples, those skilled in the art will recognize that our teachings are not so limited. Accordingly, this disclosure should be only limited by the scope of the claims attached hereto.

The invention claimed is:

1. A method for the dynamic anomaly localization of utility pole wires, said method comprising:
   providing a distributed fiber optic sensing system (DFOS), said system including
      a length of aerial optical fiber, said aerial optical fiber suspended from a plurality of utility poles; and
      a DFOS interrogator and analyzer in optical communication with the length of optical fiber;
      wherein each of the plurality of utility poles suspends in addition to the aerial optical fiber additional utility wires/cables including electrical power wires and telecommunications cables;

said method comprising:
- operating the DFOS system and generating a trained model in response to DFOS signals received during operation;
- operating the DFOS system and upon detecting an anomaly, using the trained model to determine the location on particular utility pole(s) of wire(s) affected by the anomaly; and
- reporting the anomaly to an appropriate responder organization.

2. The method of claim 1 further comprising determining from the location on the utility pole(s) whether the wire(s) affected by the anomaly are electrical power wires/cables or telecommunications wires/cables.

3. The method of claim 2 further comprising determining from the location on the utility poles whether the wire(s) affected by the anomaly are primary electrical wire(s), secondary electrical wire(s) or neutral electrical wires.

4. The method of claim 3 further comprising determining from data stored in a cloud storage system global positioning system (GPS) locations of at least two utility pole(s) closest to the anomaly detected.

5. The method of claim 4 wherein the generated model includes linear model trees.

6. The method of claim 5 wherein said generation of a trained model is performed using data generated in response to mechanical impacts made to the plurality of utility poles.

7. The method of claim 6 wherein the primary wires, secondary wires, and telecommunications wires are aerially suspended on the plurality of utility poles at different respective heights.

8. The method of claim 7 wherein the telecommunications cables include telephone and cable television wires/cables.

\* \* \* \* \*